No. 813,341. PATENTED FEB. 20, 1906.
I. G. YODERS.
REVERSING MECHANISM.
APPLICATION FILED FEB. 25, 1905.
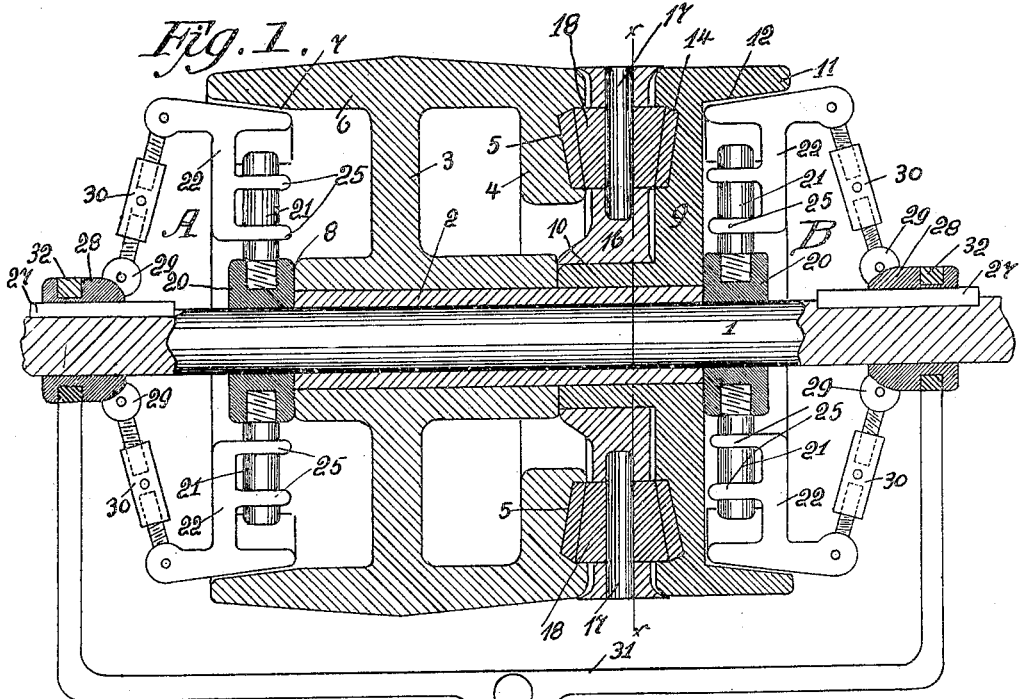
*Fig. 1.*
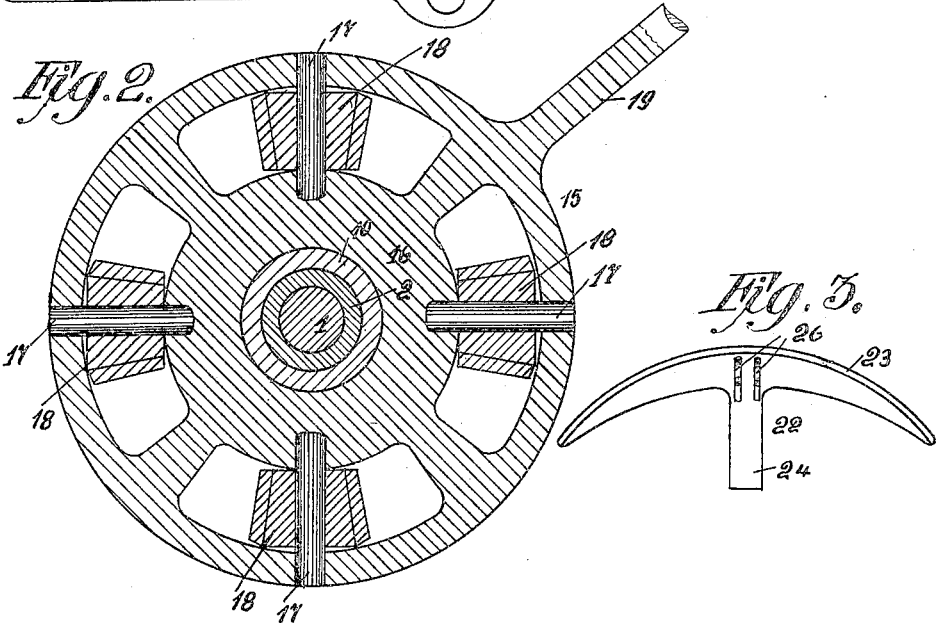
*Fig. 2.*
*Fig. 3.*
Witnesses
C. A. Rudolph
K. H. Butlen
Inventor
Irvin G. Yoders,
By N. C. Everts & Co.
Attorneys

UNITED STATES PATENT OFFICE.

IRVIN G. YODERS, OF WASHINGTON, PENNSYLVANIA, ASSIGNOR OF FIVE-EIGHTHS TO WILLIAM F. BORCHERS, OF WASHINGTON, PENNSYLVANIA.

REVERSING MECHANISM.

No. 813,341.  Specification of Letters Patent.  Patented Feb. 20, 1906.

Application filed February 25, 1905. Serial No. 247,287.

*To all whom it may concern:*

Be it known that I, IRVIN G. YODERS, a citizen of the United States of America, residing at Washington, in the county of Washington and State of Pennsylvania, have invented certain new and useful Improvements in Reversing Mechanism, of which the following is a specification, reference being had therein to the accompanying drawings.

This invention relates to certain new and useful improvements in reversing mechanism; and the invention has for its object to provide a novel form of mechanism for reversing the direction of motion of a pulley, gear, or wheel driven by a shaft.

My invention aims to provide effective and positive means as an adjunct of a drive-shaft for reversing the direction of motion of a pulley mounted upon said shaft. To this end I employ a loosely-mounted pulley, a clutch-wheel geared to said pulley, and alternately-actuated clutch members adapted to engage said pulley and said wheel. These elements are adapted to coöperate with the above-mentioned drive-shaft.

The above elements, together with certain details of construction and peculiar combinations of parts, will be hereinafter described, and then particularly pointed out in the claim.

Reference will now be had to the drawings accompanying this application, wherein like numerals of reference designate corresponding parts throughout the several views, in which—

Figure 1 is a vertical sectional view of my improved mechanism. Fig. 2 is a transverse sectional view of my mechanism, taken on the line *x x* of Fig. 1; and Fig. 3 is a detail view of a clutch-shoe employed in connection with my improved mechanism.

In the accompanying drawings I have represented my improved mechanism as being mounted upon a drive or driven shaft 1, and upon said shaft is secured a sleeve 2, upon which is rotatably mounted a pulley-wheel 3. The one edge of the pulley-wheel 3 is provided with an annular inwardly-extending flange 4, having teeth 5 formed in its outer face. The inner edge of the rim 6 of the pulley-wheel 3 is beveled, as indicated at 7, and the hub upon this side of the pulley-wheel 3 is cut away, as indicated at 8.

Upon the sleeve 2 is mounted a clutch-wheel consisting of a body portion 9, carrying a collar 10, and the periphery of the clutch-wheel 9 is provided with an annular outwardly-extending flange 11, having tapering inner sides 12. The face of the body portion of the clutch-wheel 9, which carries the collar 10, is provided with circularly-arranged teeth 14.

The reference-numeral 15 designates a spider, the hub portion 16 of which is mounted upon the collar 10, and in said spider are mounted a plurality of shafts 17, upon which are journaled pinions 18. These pinions are adapted to mesh with the teeth 5 of the pulley-wheel 3 and the teeth 14 of the clutch-wheel. The spider 15 is held stationary by an arm 19, secured to a suitable object (not shown) in close proximity to the mechanism.

Upon the shaft 1, at each end of the sleeve 2, are mounted collars 20 20, carrying posts 21 21, upon which are slidably mounted clutch members 22. One of said clutch members is illustrated in Fig. 3 of the drawings; and it consists of a segment-shaped shoe 23, a shank portion 24, carrying straps 25, and lugs 26. The straps 25 are adapted to engage over the posts 21, and when the clutch members are elevated the shoes 23 are adapted to engage the inner edges of the rims 6 of the pulley and the beveled faces 12 of the clutch 11.

Slidably mounted upon the shaft 1 by keys 27 are grooved collars 28 28, carrying lugs 29 29, and between said lugs and the lugs 26 of each of the clutch members is mounted a turnbuckle 30.

The reference-numeral 31 designates a substantially U-shaped operating-lever, the ends of which are adapted to engage straps 32, mounted in the grooved collars 28.

Operation: We will assume that the shaft 1 is being driven by a suitable motor or engine. To revolve the pulley 3 in the same direction as the shaft 1, the operating-lever 31 is shifted to move the clutch mechanism (designated by the reference character A) into engagement with the pulley 3. When the lever 31 is shifted, the collar 28 moves inwardly toward the pulley, and through the medium of the turnbuckle 30 elevates the clutch members, causing the shoes 23 to engage the pulley 3. The rotation of the pulley 3 with the shaft 1 causes the pinions 18 to rotate, and through the medium of the teeth 5 and the teeth 14 the clutch-wheel will be rotated freely in the opposite direction, it of course being understood that the clutch members designated by the reference character B are not in engagament with the clutch-wheel.

Should it be desired to rotate the pulley 3 in the opposite direction from that of the shaft 1, the operating-lever 31 is again shifted, which will disengage the clutch members A and engage the clutch members B with the clutch-wheel, and through the medium of the pinions 18, the teeth 15 and 14 of the clutch-wheel, and the loosely-mounted pulley said pulley will be revolved in an opposite direction from that in which the shaft 1 rotates.

By the construction of my device it is possible to entirely disengage the clutch members A and B from the pulley-wheel and the clutch member, whereby said pulley and said clutch member can freely rotate. This feature is extremely valuable in connection with the starting of an engine, it being possible to start an engine without any load and then operate the clutch members to throw in the load to be carried by said engine. The device is particularly adapted for use in connection with oil-well work or hoisting-engines, where loads are to be handled and lifted. By entirely disengaging the clutch members A and B it is possible to lower the load without the use of the power, or after the load has been lifted it can be readily handled with a suitable brake operating in connection with my improved device.

I do not care to confine myself to the operating-lever illustrated, as I may employ a drive-shaft having a groove formed therein and mount a rod in the groove which will act as an operating-lever and be more convenient in some instances than the type illustrated.

I do not care to restrict myself to the exact number of clutch members illustrated nor to the arrangement and the size of the different parts of my improved mechanism, as the same are susceptible to various changes without departing from the general spirit and scope of the invention.

What I claim, and desire to secure by Letters Patent, is—

In reversing mechanism, the combination with a shaft, a pulley loosely mounted on said shaft and having a laterally-extending rim at one side and circularly-disposed teeth on the other side, a clutch-wheel loosely mounted on said shaft and having a laterally-extending rim at one side and having circularly-disposed teeth on the other side, of a spider arranged between said pulley and said clutch-wheel, said spider being mounted upon a collar carried by said clutch-wheel, and pinions carried by said spider and engaging the teeth on the pulley and the teeth on the clutch-wheel, collars mounted on the shaft adjacent the pulley and the clutch-wheel, radially-disposed posts carried by said collars, clutch members slidably mounted on said posts, collars slidably mounted on the shaft and connected together so as to move simultaneously, and turnbuckles connected to said collars and connected to said clutch members.

In testimony whereof I affix my signature in the presence of two witnesses.

IRVIN G. YODERS.

Witnesses:
W. A. WATSON,
D. M. DONEHOO.